United States Patent
Tonn

(10) Patent No.: US 9,866,574 B1
(45) Date of Patent: Jan. 9, 2018

(54) PROTECTED DATA TYPE HANDLING AWARENESS

(71) Applicant: Amazon Technologies, Inc., Seattle, WA (US)

(72) Inventor: Trevor Nicolas Tonn, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 298 days.

(21) Appl. No.: 14/727,408

(22) Filed: Jun. 1, 2015

(51) Int. Cl.
*H04L 29/06* (2006.01)
*H04L 29/08* (2006.01)
*G06F 21/00* (2013.01)
*G06F 21/56* (2013.01)

(52) U.S. Cl.
CPC .......... *H04L 63/1416* (2013.01); *H04L 67/10* (2013.01)

(58) Field of Classification Search
CPC ..... H04L 63/10; H04L 63/20; H04L 63/1416; H04L 67/10; G06F 21/10; G06F 2221/2101; G06F 21/57; B41J 2202/20; B41J 2/04505; B41J 2/04508; B41J 2/0451
See application file for complete search history.

(56) References Cited

U.S. PATENT DOCUMENTS

| | | | | |
|---|---|---|---|---|
| 5,699,509 A * | 12/1997 | Gary | ........................ | G06F 11/08 714/48 |
| 9,053,322 B2 * | 6/2015 | Wang | ........................ | G06F 21/57 |
| 9,235,704 B2 * | 1/2016 | Wootton | ................ | G06F 21/564 |
| 9,578,017 B2 * | 2/2017 | Ferguson | ............ | H04L 63/0823 |
| 2013/0167128 A1 * | 6/2013 | Narayana Iyer | .......... | G06F 8/41 717/143 |
| 2014/0095694 A1 * | 4/2014 | Kimmet | .............. | G06F 11/3006 709/224 |
| 2016/0285707 A1 * | 9/2016 | Pawlowski | ........... | H04L 43/045 |

OTHER PUBLICATIONS

Koushanfar et al., CAD-based security, cryptography, and digital rights management, Jun. 2007, 2 pages.*
Fiala et al., Detection and correction of silent data corruption for large-scale high-performance computing, Nov. 2012, 12 pages.*

* cited by examiner

*Primary Examiner* — Thuy Dao
(74) *Attorney, Agent, or Firm* — Lee & Hayes, PLLC

(57) ABSTRACT

Protected data type classes are provided for performing operations on protected data types. A fact manifest is generated for a software package that utilizes the classes at build time. The fact manifest describes the protected data types used by the software package. The fact manifest can be used to deploy the software package only to hosts that are authorized to handle the specified protected data types. The fact manifest can also be utilized to create a protected data type usage graph that identifies the hosts that handle protected data, the type of protected data handled, and the network connections between the hosts. The protected data type classes can also generate data at runtime identifying the runtime usage of protected data. The protected data type usage graph can also specify the runtime usage of protected data by the hosts.

20 Claims, 8 Drawing Sheets

RUNTIME ANALYSIS OF PROTECTED DATA TYPE USAGE

BUILD AND DEPLOYMENT TIME ANALYSIS
OF PROTECTED DATA TYPE USAGE

RUNTIME ANALYSIS OF PROTECTED DATA TYPE USAGE

PROTECTED DATA TYPE USAGE GRAPH

PROTECTED DATA TYPE HANDLING AWARENESS

BACKGROUND

Many types of organizations create and utilize computing systems that store and operate on data types that include protected data. Protected data includes, but is not limited to, data that is to be maintained in confidence, such as credit card or bank account numbers, customer names and contact information, health information, usernames, passwords, and other types of credentials, and other types of sensitive data.

In organizations that utilize large numbers of computing systems and services, it can be difficult to identify computing systems operated by the organization that operate on or store data types that include protected data. As a result, it can be difficult for such organizations to identify security weaknesses within systems that handle protected data and to efficiently respond to data breaches where protected data is exposed to an intruder.

It is with respect to these and other considerations that the disclosure made herein is presented.

DETAILED DESCRIPTION

Figure 1:
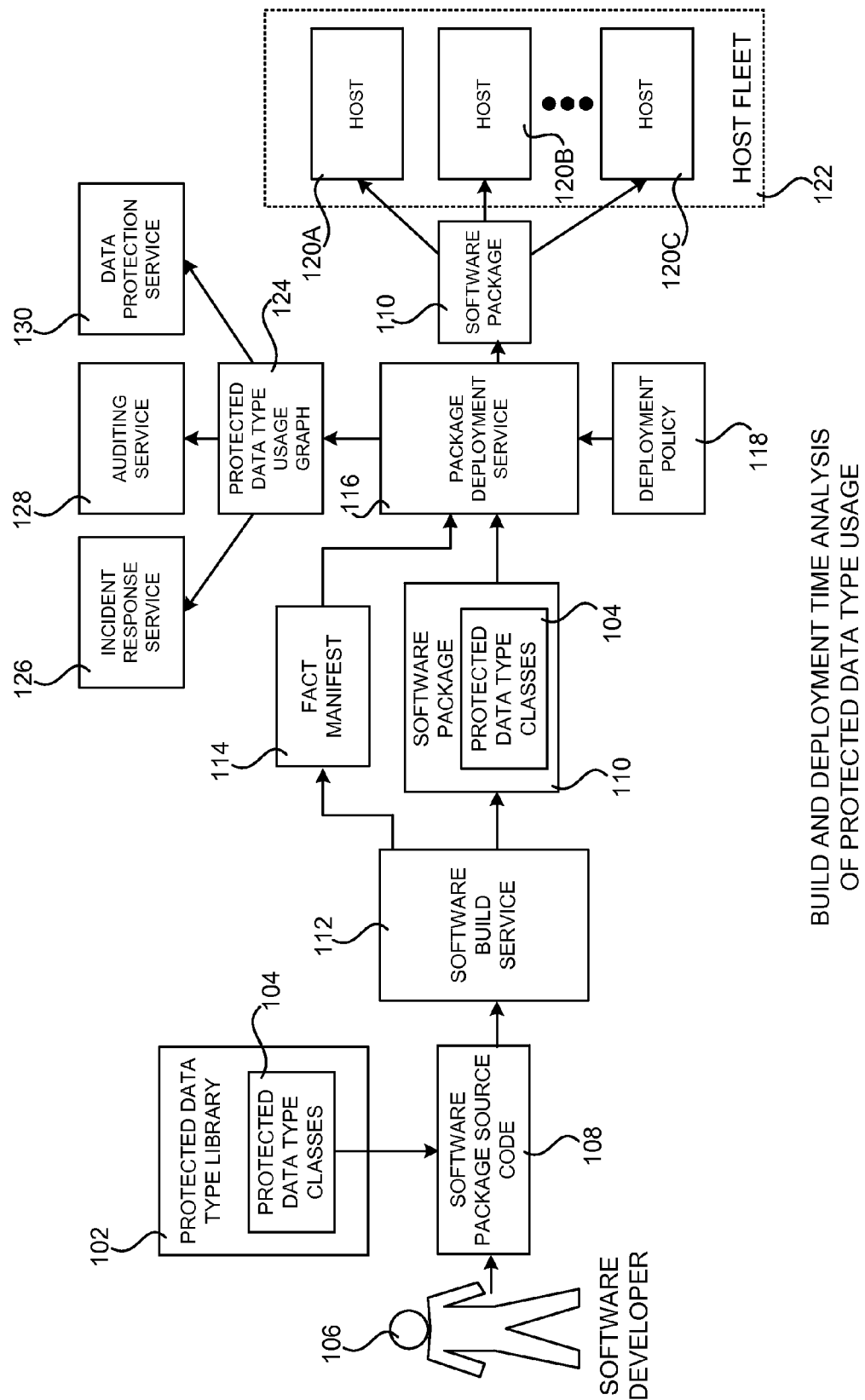
FIG. 1 is a network services architecture diagram providing an overview of a system disclosed herein for build and deployment time analysis of protected data type usage, according to one configuration presented herein.

The following detailed description is directed to technologies for protected data type handling awareness. Utilizing the technologies described herein, the extent to which computing systems in an organization utilize protected data can be determined in an automated fashion. This information can then be utilized for various purposes including, but not limited to, limiting the deployment of software packages that handle protected data to authorized systems, to identify security weaknesses within systems that handle protected data, and to more efficiently respond to data breaches where protected data is exposed to an intruder than currently possible.

In one particular implementation disclosed herein, a protected data type library is provided that includes protected data type classes for performing various types of operations on protected data. As discussed briefly above, protected data includes, but is not limited to, data that is to be maintained in confidence, such as credit card or bank account numbers, customer names and contact information, health information, usernames, passwords, and other types of credentials, and other types of sensitive data.

The protected data type classes provide functionality for performing operations on protected data such as, but not limited to, creating and storing data types that store protected data (referred to herein as "protected data types"), converting protected data stored in protected data types, validating protected data stored in protected data types, retrieving protected data from protected data types, or emitting (e.g. printing) protected data contained in protected data types. The protected data type classes can also provide other types of functionality for operating on protected data types in other ways. The protected data type classes can also be provided for use with multiple different programming languages in order to encourage wide utilization within an organization.

A software developer can utilize the protected data type classes when programming source code for a software package that utilizes protected data. At the time the source code for the software package is built (i.e. "build time"), a fact manifest can also be generated that identifies the protected data types used by the software package. The fact manifest can also provide other details regarding the utilization of protected data by the software package such as, but not limited to, data indicating the location, or locations, within the software package where the protected data is utilized. The software package and its associated fact manifest can then be provided to a package deployment service for deployment to host computers ("hosts") within an organization. The hosts might be physical or virtual computing systems.

When the package deployment service receives a request for a software package from a host, the package deployment service can utilize the fact manifest for the software package and a deployment policy to determine whether the software package is to be deployed to the host. In this way, the deployment of software packages that handle protected data can be limited to only those hosts that are authorized by the deployment policy to execute program code that handles protected data. The fact manifest can also be utilized by the package deployment service in other ways to restrict deployment of program code that handles protected data.

In some configurations, the package deployment service (or another service) can also be configured to generate a protected data type usage graph. The protected data type usage graph contains data identifying the protected data types utilized by a software package along with data identifying the hosts to which the software package has been deployed. For example, and without limitation, the protected data type usage graph can be represented as nodes corresponding to hosts to which a software package that handles protected data has been deployed and vertices connecting the nodes that represent network connections between the hosts. Each node can also specify properties of the software package such as, but not limited to, the type of protected data handled by the software package, the location within the software package where the protected data is handled, and other types of information.

In some configurations, the protected data type classes also include functionality for emitting data at runtime that describes the runtime usage of protected data. This information can be collected from executing software packages and utilized to update the protected data type usage graph to include information describing the actual runtime usage of protected data. In this manner, real-time, up-to-date, accurate information can be collected and made available to an organization regarding the hosts to which program code that handles protected data has been deployed along with information describing the actual runtime usage of protected data by the program code.

In some configurations, an interface is exposed, such as a network services application programming interface ("API"), through which interested services can obtain the protected data type usage graph. For example, and without limitation, an incident response service might utilize an API to obtain the protected data type usage graph for use in determining the protected data that was exposed to an intruder during a breach. As another example, an auditing service might utilize the API to obtain the protected data type usage graph for use in identifying gaps in policy regarding the hardening or public exposure of systems containing or handling certain protected data types or combinations of protected data types.

As yet another example, a data protection service might utilize the API to obtain the protected data type usage graph for use in determining where multiple types of protected data are handled on the same host. This information might be utilized to pay extra scrutiny to hosts handling multiple protected data types or to reconfigure these hosts such that they only handle a single type of protected data. The protected data type usage graph can also be utilized in other ways in other configurations. Additional details regarding the various components and processes described briefly above for protected data type handling awareness will be presented below with regard to FIGS. 1-8.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The configurations described herein can be practiced in distributed computing environments, where tasks are performed by remote processing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 is a network services architecture diagram providing an overview of a system disclosed herein for build and deployment time analysis of protected data type usage, according to one configuration presented herein. As shown in FIG. 1, and described briefly above, a protected data type library 102 is provided that includes protected data type classes 104 for performing various types of operations on protected data. As discussed above, protected data includes, but is not limited to, data that is to be maintained in confidence, such as credit card or bank account numbers, customer names and contact information, health information, usernames, passwords, and other types of credentials, and other types of sensitive data.

The protected data type classes 104 provide functionality for performing operations on protected data such as, but not limited to, creating and storing data types that store protected data ("protected data types"), converting protected data stored in protected data types, validating protected data stored in protected data types, retrieving protected data from protected data types, or emitting (e.g. printing) protected data contained in protected data types. The protected data type classes 104 can also provide other types of functionality for operating on protected data types in other ways. The protected data type classes 104 can also be provided for use with multiple different programming languages in order to encourage wide utilization by software within an organization.

As also discussed briefly above, a software developer 106 can utilize the protected data type classes 104 when programming the source code 108 for a software package 110 that utilizes protected data. At the time a software build service 112 builds the source code 108 for the software package 110 (i.e. "build time"), the software build service 112 (or another service) can generate a fact manifest 114 that identifies the protected data types used by the protected data type classes 104 utilized by the built software package 110. The fact manifest 114 can also provide other details regarding the utilization of protected data by the software package 110 such as, but not limited to, data indicating the location, or locations, within the software package 110 where the protected data is utilized. The software package 110 and its associated fact manifest 114 can then be provided to a package deployment service 116 for deployment to host computers ("hosts") within a host fleet 122. In the example shown in FIG. 1, for instance, the built software package 110 has been deployed to the hosts 120A-120C for execution. As mentioned above, the hosts 120 might be physical or virtual computing systems.

When the package deployment service 116 receives a request for the software package 110 from one of the hosts 120, the package deployment service 116 can utilize the fact manifest 114 associated with the software package 110 and a deployment policy 118 to determine whether the software package 110 can be deployed to the requesting host 120. In this way, the deployment of a software package 110 that handles protected data can be limited to only those hosts 120 that are authorized by the deployment policy 118 to execute program code that handles protected data. The fact manifest 114 can also be utilized by the package deployment service 116 in other ways to restrict deployment of a software package 110 that handles protected data.

As also discussed above, the package deployment service 116 (or another service) can also be configured to generate a protected data type usage graph 124 in some configurations. The protected data type usage graph 124 contains data identifying the protected data types utilized by a software package 110 along with data identifying the hosts 120 to which the software package 110 has been deployed. For example, and without limitation, the protected data type usage graph 124 can be represented as nodes corresponding to hosts 120 to which a software package 110 that handles protected data has been deployed and vertices connecting the nodes that represent network connections between the hosts 120. Each node can also specify properties of the software package 110 such as, but not limited to, the type of protected data handled by the software package 110, the location within the software package 110 where the protected data is handled, and other types of information. Additional details regarding the configuration of the protected data type usage graph 124 are provided below with regard to FIG. 5.

In some configurations, the protected data type classes 104 also include functionality for emitting data at runtime that describes the runtime usage of protected data. This information can be collected from executing software packages 110 and utilized to update the protected data type usage graph 124 to include information describing the actual runtime usage of protected data. Additional details regarding one configuration for runtime analysis of protected data type usage will be provided below with regard to FIGS. 3 and 4.

In some configurations the package deployment service 116 (or another service) exposes an interface, such as a network services API, through which other systems and services can obtain the protected data type usage graph 124. For example, and without limitation, in one configuration an incident response service 126 can utilize an API to obtain the protected data type usage graph 124 for use in determining the protected data that was exposed to an intruder during a breach. For instance, if it is known which of the hosts 120 an intruder had access to, the incident response service 126 could quickly compile a list of protected data types that might have been exposed to the attacker.

As another example, an auditing service 128 can utilize the API described above to obtain the protected data type usage graph 124 for use in identifying gaps in policy regarding the hardening or public exposure of hosts 120 containing or handling certain protected data types or combinations of protected data types. For example, the protected data type usage graph 124 may be traversed to identify nodes that indicate potential handling of protected data types of interest.

As yet another example, a data protection service 130 can utilize the API described above to obtain the protected data type usage graph 124 for use in determining where multiple types of protected data are handled on the same host 120. This information might be utilized to pay extra scrutiny to hosts 120 handling multiple protected data types or to reconfigure these hosts 120 such that they only handle a single type of protected data.

The protected data type usage graph 124 can also be utilized in other ways in other configurations. For example, and without limitation, operations by hosts 120 indicated by the protected data type usage graph 124 as operating on protected data types might be monitored. Hosts 120 that appear to be performing unauthorized, unsafe, or suspicious operations on protected data types might be shut down or have their operation restricted in other ways. Other operations might also be implemented using the protected data type usage graph 124. Additional details regarding the operation of the system shown in FIG. 1 for build and deployment time analysis of protected data type usage will be provided below with regard to FIG. 2.

Figure 2:
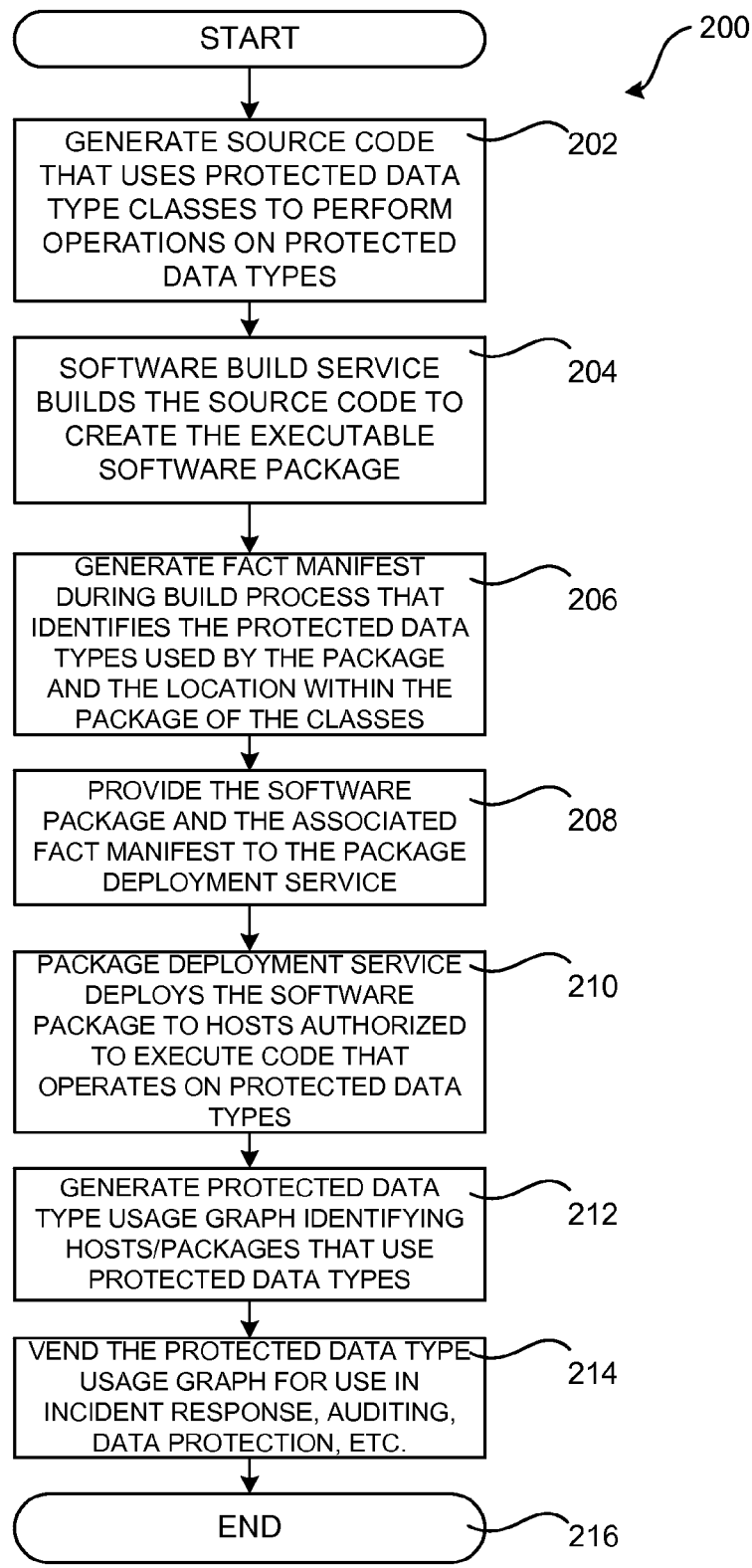
FIG. 2 is a flow diagram showing a routine that illustrates aspects of the operation of the system shown in FIG. 1 for build and deployment time analysis of protected data type usage.

FIG. 2 is a flow diagram showing a routine 200 that illustrates aspects of the operation of the system shown in FIG. 1 for build and deployment time analysis of protected data type usage in one configuration disclosed herein. It should be appreciated that the logical operations described herein with respect to FIG. 2 and the other figures are implemented (1) as a sequence of computer implemented acts or program modules running on a computing system and/or (2) as interconnected machine logic circuits or circuit modules within the computing system. The implementation of the various components described herein is a matter of choice dependent on the performance and other requirements of the computing system.

Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein.

The routine 200 begins at operation 202, where source code 108 is generated for a software package 110 that utilizes one or more of the protected data type classes 104 in the protected data type library 102. As discussed above, the protected data type classes 104 enable various types of operations to be performed on protected data such as those described above.

From operation 202, the routine 200 proceeds to operation 204, where the software build service 112 builds the source code 108 to create an executable software package 110. As shown in FIG. 1, and described above, the software package 110 includes one or more of the protected data type classes 104 for performing operations on protected data.

From operation 204, the routine 200 proceeds to operation 206, where the software build service 112 (or another service) generates a fact manifest 114 for the software package 110. As discussed above, the fact manifest 114 includes data that identifies the protected data types used by the protected data type classes 104 utilized by the software package 110. As also discussed above, the fact manifest 114 can also provide other details regarding the utilization of protected data by the software package 110 such as, but not limited to, data indicating the location, or locations, within the software package 110 where the protected data is utilized.

From operation 206, the routine 200 proceeds to operation 208, where the software build service 112 provides the software package 110 and its associated fact manifest 114 to the package deployment service 116 for deployment to hosts 120 within a host fleet 122. As mentioned above, the hosts 120 might be physical or virtual computing systems.

From operation 208, the routine 200 proceeds to operation 210, where the package deployment service 116 deploys the software package 110 to one or more hosts 120 in the host fleet 122. For example, and without limitation, the package deployment service 116 may receive a request for the software package 110 from one of the hosts 120. In response thereto, the package deployment service 116 can utilize the fact manifest 114 associated with the software package 110 and the deployment policy 118 to determine whether the software package 110 can be deployed to the requesting host 120. The deployment policy 118 might specify, for example, whether the requesting host 120 is authorized to handle protected data of the type operated on by the software package 110. Deployment of a software package 110 that handles certain types of protected data can be limited to only those hosts 120 that are authorized by the deployment policy 118 to execute program code that handles the particular types of protected data.

From operation 210, the routine 200 proceeds to operation 212, where the package deployment service 116 (or another service) generates and/or updates the protected data type usage graph 124. As discussed above, the protected data type usage graph 124 contains data identifying the protected data types utilized by the software package 110 along with data identifying the hosts 120 to which the software package 110 has been deployed. As described in greater detail below, the protected data type usage graph 124 can also contain other types of information such as, but not limited to, data identifying the runtime handling of protected data by the hosts 120. Additional details regarding the construction of the protected data type usage graph 124 will be provided below with regard to FIG. 5.

From operation 212, the routine 200 proceeds to operation 214 where the package deployment service 116 (or another service) vends the protected data type usage graph 124. For example, and as discussed above, a web services API can be exposed through which other services, such as the incident response service 126, the auditing service 128, and the data protection service 130, can obtain the protected data type usage graph 124. The protected data type usage graph 124 can be provided to other services using other mechanisms in other configurations. From operation 214, the routine 200 proceeds to operation 216, where it ends.

Figure 3:
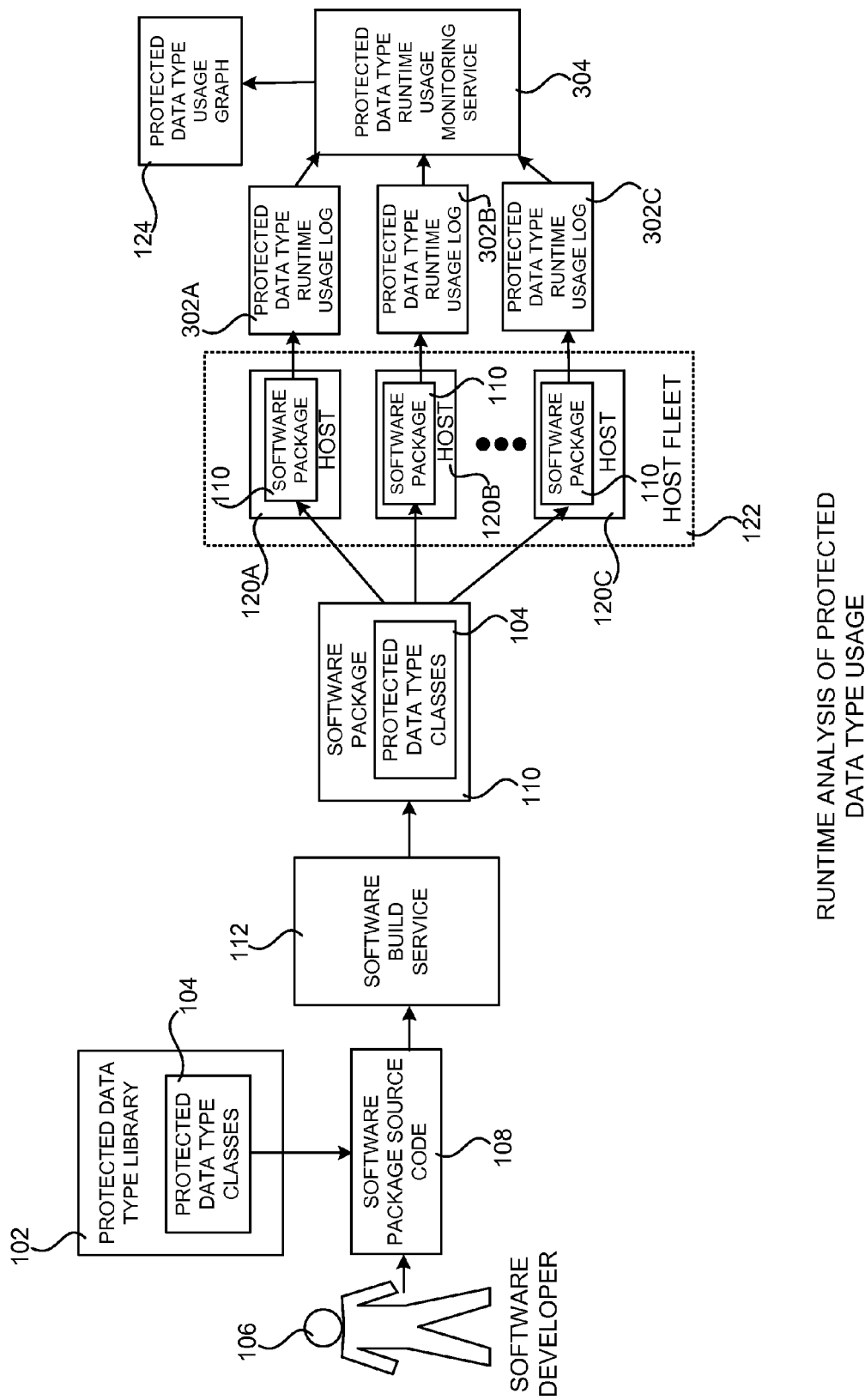
FIG. 3 is a network services architecture diagram providing an overview of a system disclosed herein for runtime analysis of protected data type usage, according to one configuration presented herein.

FIG. 3 is a network services architecture diagram providing an overview of a system disclosed herein for runtime analysis of protected data type usage, according to one configuration presented herein. As in the configuration described above with regard to FIGS. 1 and 2, a protected data type library 102 is provided that includes protected data type classes 104 for performing various types of operations on protected data. In the configuration shown in FIG. 3, however, the protected data type classes 104 also include functionality for emitting data at runtime that describes their runtime usage of protected data. For instance, in the example shown in FIG. 3, the software package 110 has been deployed to the hosts 120A-120C. At runtime, the software package 110 executing on each of the hosts 120A-120C generates a protected data type runtime usage log 302A-302C, respectively. The protected data type runtime usage log 302 describes the runtime utilization of protected data by each instance of the software package 110. In this regard, it should be appreciated that the runtime usage log 302 does not include any protected data.

As also shown in FIG. 3, the protected data type runtime usage logs 302 can be collected in real or near-real time. In the example shown in FIG. 3, for instance, a protected data type runtime usage monitoring service 304 receives the protected data type runtime usage logs 302. Another service can collect the protected data type runtime usage logs 302 in other configurations. Various mechanisms can also be utilized to provide the usage logs 302 to the monitoring service 304. For example, and without limitation, a daemon or other type of process executing on the hosts 120 might store the usage logs 302 using a storage service (not shown) for retrieval by the monitoring service 304, provide the usage logs 302 to an API exposed by monitoring service 304, or provide the usage logs 302 to another service configured to maintain the usage graph 124. Other mechanisms can also be utilized to obtain the usage logs 302 from the hosts 120 and update the usage graph 124.

As additionally shown in FIG. 3, the protected data type runtime usage logs 302 can be utilized to update the protected data type usage graph 124 to include information describing the actual runtime usage of protected data by the instances of the software package 110 executing on the hosts 120A-120C. In this manner, real-time, up-to-date, accurate information can be collected and made available to an organization regarding the hosts 120 to which software packages 110 that handle protected data have been deployed along with information describing the actual runtime usage of protected data by the software packages 110. This information can then be utilized for various purposes, some of which were described in detail above. Additional details regarding the operation of the system shown in FIG. 3 for runtime analysis of protected data type usage will be provided below with regard to FIG. 4.

Figure 4:
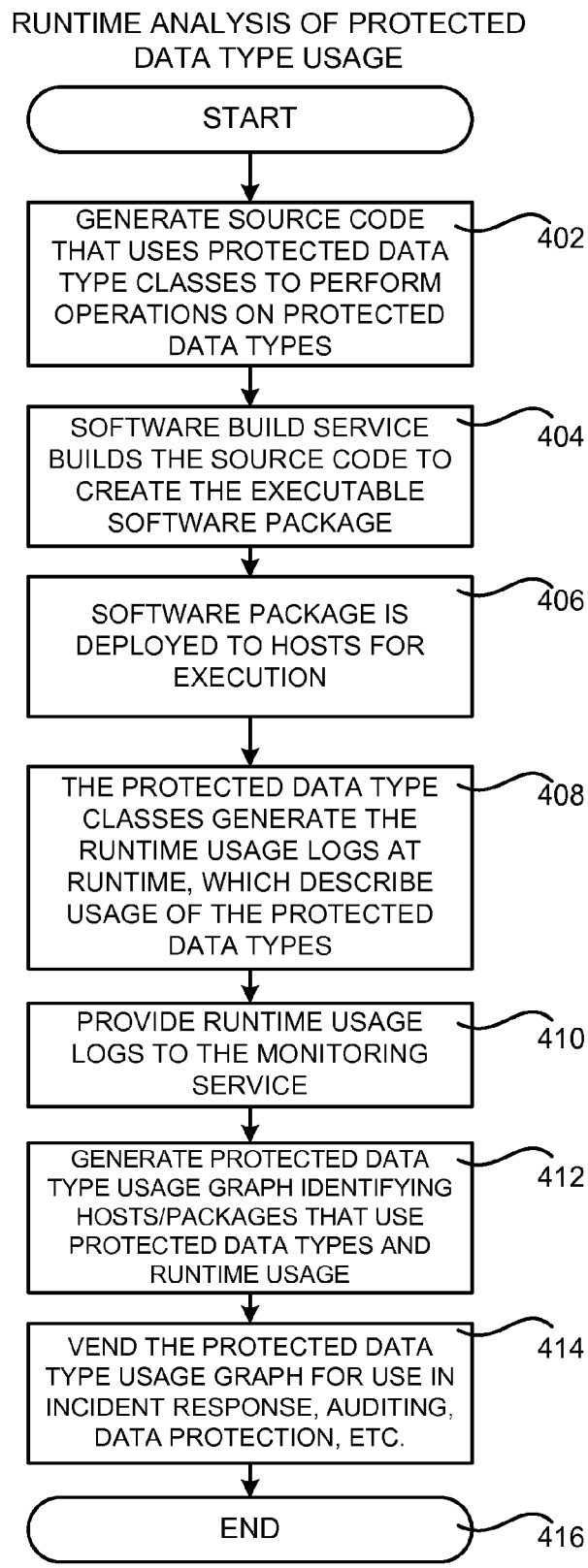
FIG. 4 is a flow diagram showing a routine that illustrates aspects of the operation of the system shown in FIG. 3 for runtime analysis of protected data type usage.

FIG. 4 is a flow diagram showing a routine 400 that illustrates aspects of the operation of the system shown in FIG. 3 for runtime analysis of protected data type usage. The routine 400 begins at operation 402, where source code 108 is generated for a software package 110 that utilizes one or more of the protected data type classes 104 in the protected data type library 102. As discussed above, the protected data type classes 104 enable various types of operations to be performed on protected data such as those described above. In this configuration, the protected data type classes 104 are also configured to emit data describing their runtime usage of protected data.

From operation 402, the routine 400 proceeds to operation 404, where the software build service 112 builds the source code 108 to create an executable software package 110. As shown in FIG. 3, and described above, the software package 110 includes one or more of the protected data type classes 104 for performing operations on protected data.

From operation 404, the routine 400 proceeds to operation 406, where the software build service 112 provides the software package 110 to the package deployment service 116. In turn, the package deployment service 116 deploys the software package 110 to one or more hosts 120 in the host fleet 122 for execution.

From operation 406, the routine 400 proceeds to operation 408, where the software package 110 executes on the hosts 120 to which it is deployed. During execution, the software package 110 generates data describing the runtime usage of protected data. For instance, in the example configuration shown in FIG. 3, the software package 110 generates the protected data type runtime usage log 302, which includes data describing the usage of protected data.

From operation 408, the routine 400 proceeds to operation 410, where the software package 110 provides the protected data type runtime usage log 302 to the protected data type runtime usage monitoring service 304 in one configuration. In turn, the protected data type runtime usage monitoring service 304 (or another service) generates and/or updates the protected data type usage graph 124 to reflect the runtime usage of protected data by the software package 110.

From operation 412, the routine 400 proceeds to operation 414 where the protected data type usage graph 124 is exposed for use by other services and/or systems. For example, and as discussed above, a web services API can be exposed through which other services, such as the incident response service 126, the auditing service 128, and the data protection service 130, can obtain the protected data type usage graph 124, including the data describing the runtime usage of protected data. The protected data type usage graph 124 can be provided to other services using other mechanisms in other configurations. From operation 414, the routine 400 proceeds to operation 416, where it ends.

Figure 5:
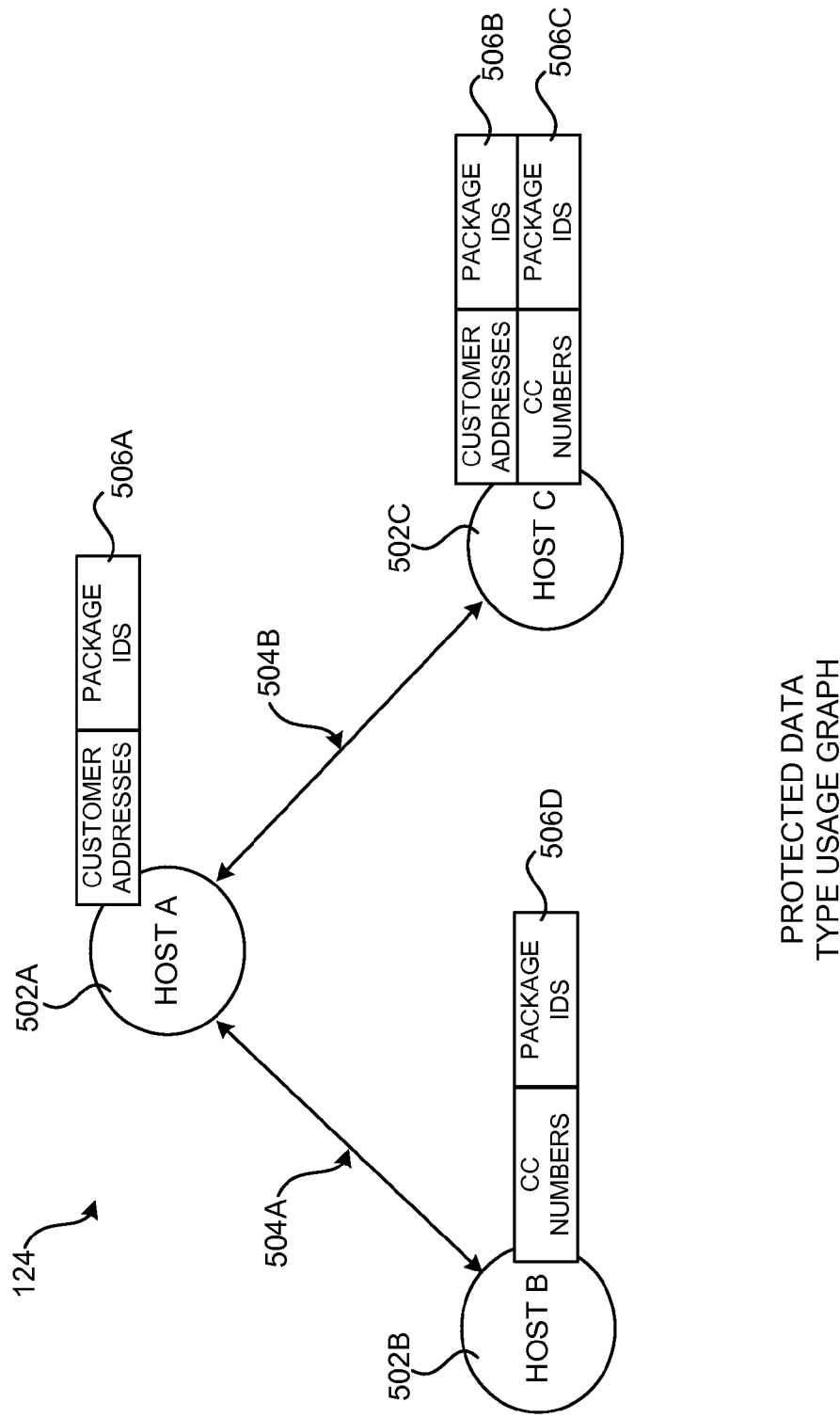
FIG. 5 is a data structure diagram showing aspects of the configuration of a protected data type usage graph utilized in various configurations presented herein.

FIG. 5 is a data structure diagram showing aspects of the configuration of a protected data type usage graph 124 utilized in various configurations presented herein. As shown in FIG. 5 and discussed briefly above, the protected data type usage graph 124 contains data identifying the protected data types utilized by a software package 110 along with data identifying the hosts 120 to which the software package 110 has been deployed. For example, and without limitation, in the example shown in FIG. 5, the protected data type usage graph 124 is represented as nodes 502A-502C corresponding to hosts 120 to which software package 110 that handle protected data has been deployed. In the example shown in FIG. 5, software packages 110 that handle protected data have been deployed to three hosts 120 corresponding to the nodes 502A-502C in the graph 124.

In the example shown in FIG. 5, the protected data type usage graph 124 also includes vertices 504 between nodes 502 that represent network connections (i.e. the existence of a data connection between two hosts) between the hosts 120. In the example shown in FIG. 5, the vertex 504A indicates that there is a network connection between the host "A" represented by the node 502A and the host "B" represented by the node 502B. The vertex 504B indicates that there is a network connection between the host "A" represented by the node 502A and the host "C" represented by the node 502C. Other types of connections might also be made between nodes 502 in the protected data type usage graph 124 to specify other types of relationships or interdependencies. In this regard, it should be appreciated that various computing systems (not shown in the FIGS.) can maintain and expose information regarding the data connections between the hosts 120. This information can be obtained and utilized to generated and/or update the usage graph 124 in various configurations.

Each node 502 in the protected data type usage graph 124 can also specify properties 506 of the software packages 110 installed on the associated host 120 such as, but not limited to, software package identifiers ("IDs") for the installed packages, the type of protected data handled by the software packages 110, the location within the software packages 110 where the protected data is handled, and data specifying the runtime usage of protected data by software packages 110 executing on the host 120.

For instance, in the example shown in FIG. 5, the property 506A indicates that the host "A" represented by the node 502A includes a software package 110 that handles customer addresses. Similarly, the property 506B indicates that the host "B" represented by the node 502B includes a software package 110 that handles credit card numbers. The properties 506B and 506C indicate that the host "C" represented by the node 502C includes software packages 110 that handle customer addresses and credit card numbers.

It should be appreciated that the configuration of the example protected data type usage graph 124 shown in FIG. 5 has been simplified for discussion purposes and that the protected data type usage graph 124 may include many more nodes 502, vertices 504, and properties 506 than illustrated therein. It should also be appreciated that the protected data type usage graph 124 can be organized in other ways depending upon the intended use of the protected data type usage graph 124. Alternate configurations will be apparent to those skilled in the art.

It should also be appreciated that while the configurations disclosed herein have primarily been presented in the context of operations on protected data types, the technologies disclosed herein can be utilized in a similar fashion to monitor the usage of other types of data and/or the performance of other types of operations of interest. For example, and without limitation, the technologies disclosed herein can be utilized to monitor the performance of certain functions, method calls, and/or the execution of other types of program code. Other use cases will be apparent to those of skill in the relevant art.

Figure 6:
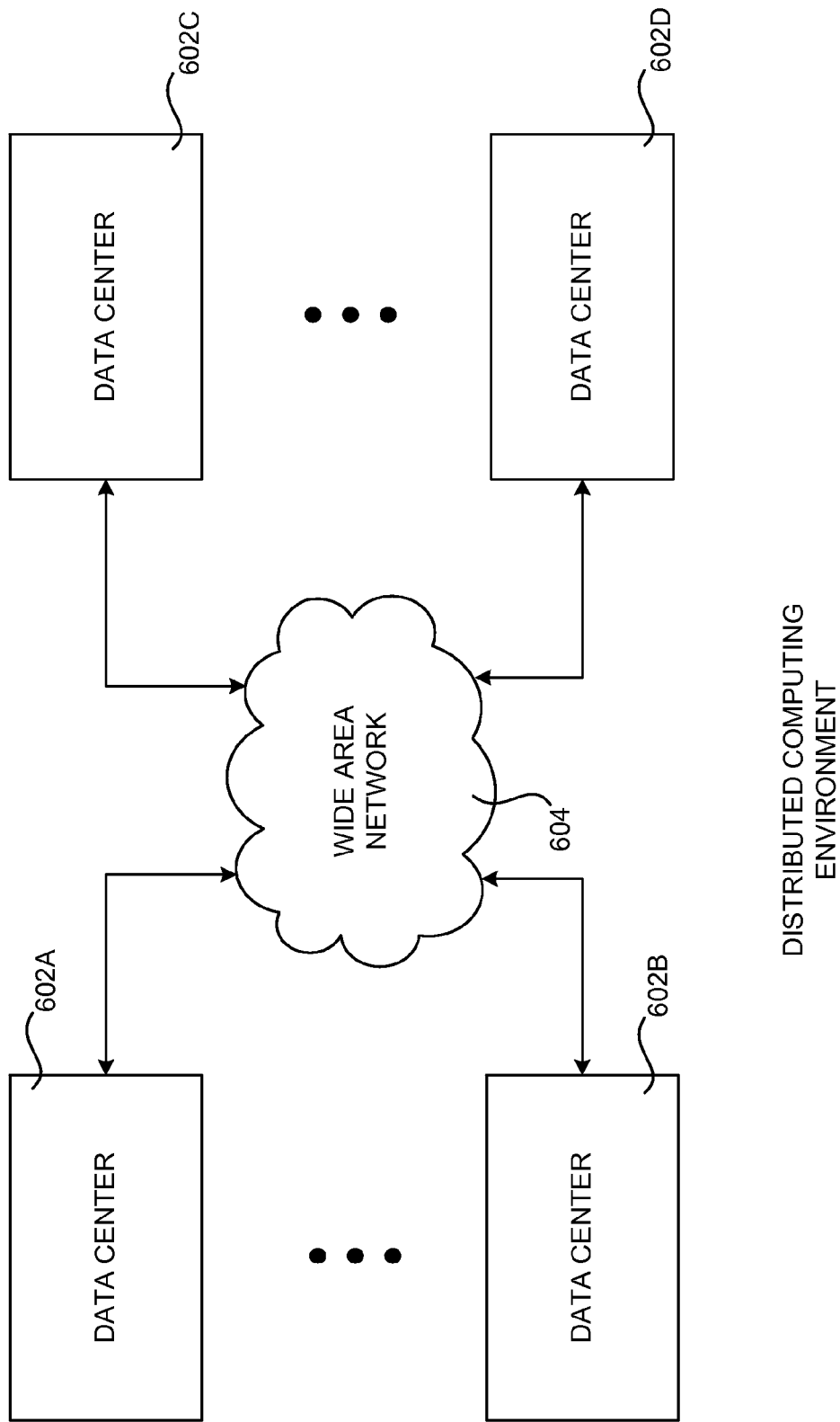
FIG. 6 is network diagram showing aspects of a distributed computing environment in which the configurations presented herein can be implemented.

FIG. 6 is a network diagram showing aspects of a distributed computing environment that can be utilized to provide an operating environment for the various technologies disclosed herein. In particular, the distributed computing environment shown in FIG. 6 can provide a suitable computing environment in which the various technologies described herein can be implemented. The distributed computing environment shown in FIG. 6 is configured using a service-oriented architecture in one implementation. Other configurations can also be utilized.

The distributed computing environment shown in FIG. 6 can provide computing resources for executing distributed programs on a permanent or an as-needed basis. The computing resources provided by the distributed computing environment can include various types of resources, such as data processing resources, data storage resources, data communication resources, and the like. Each type of computing resource can be general-purpose or can be available in a number of specific configurations. For example, data processing resources can be available as virtual machine instances. The instances can be configured to execute programs, including Web servers, application servers, media servers, database servers, and other types of components such as those described in detail above. Data storage resources can include file storage devices, block storage devices, and the like. Each type or configuration of computing resource can be available in different sizes, such as large resources, consisting of many processors, large amounts of memory, and/or large storage capacity, and small resources consisting of fewer processors, smaller amounts of memory, and/or smaller storage capacity.

The computing resources provided by the distributed computing environment shown in FIG. 6 are furnished in one configuration by server computers and other components operating in one or more data centers 602A-602D (which might be referred to herein singularly "as a data center 602" or collectively as "the data centers 602"). The data centers 602 are facilities utilized to house and operate computer systems and associated components for providing a distributed computing environment. The data centers 602 typically include redundant and backup power, communications, cooling, and security systems. The data centers 602 can also be located in geographically disparate locations. One illustrative configuration for a data center 602 that implements aspects of the technologies disclosed herein for protected data type handling awareness will be described below with regard to FIG. 7.

Users of the distributed computing environment illustrated in FIG. 6 can access the computing resources provided by the data centers 602 over a wide-area network ("WAN") 604. Although a WAN 604 is illustrated in FIG. 6, it should be appreciated that a local-area network ("LAN"), the Internet, or any other networking topology known in the art that connects the data centers 602 to remote customers and other users can be utilized. It should also be appreciated that combinations of such networks can also be utilized.

The distributed computing environment can provide various interfaces through which aspects of its operation can be configured. For instance, various APIs can be exposed by components operating in the distributed computing environment shown in in FIG. 6 for configuring various aspects of its operation and for utilizing various aspects of the functionality that it provides. Other mechanisms for configuring the operation of components in the distributed computing environment and for utilizing these components can also be utilized.

According to configurations disclosed herein, the capacity of resources provided by the distributed computing environment can be scaled in response to demand. In this regard, scaling refers to the process of instantiating (which might also be referred to herein as "launching" or "creating") or terminating (which might also be referred to herein as "de-scaling") instances of computing resources in response to demand. Auto scaling is one mechanism for scaling computing resources in response to increases or lulls in demand for the resources. Additional details regarding the functionality provided by the data centers 602 will be provided below with regard to FIG. 7.

Figure 7:
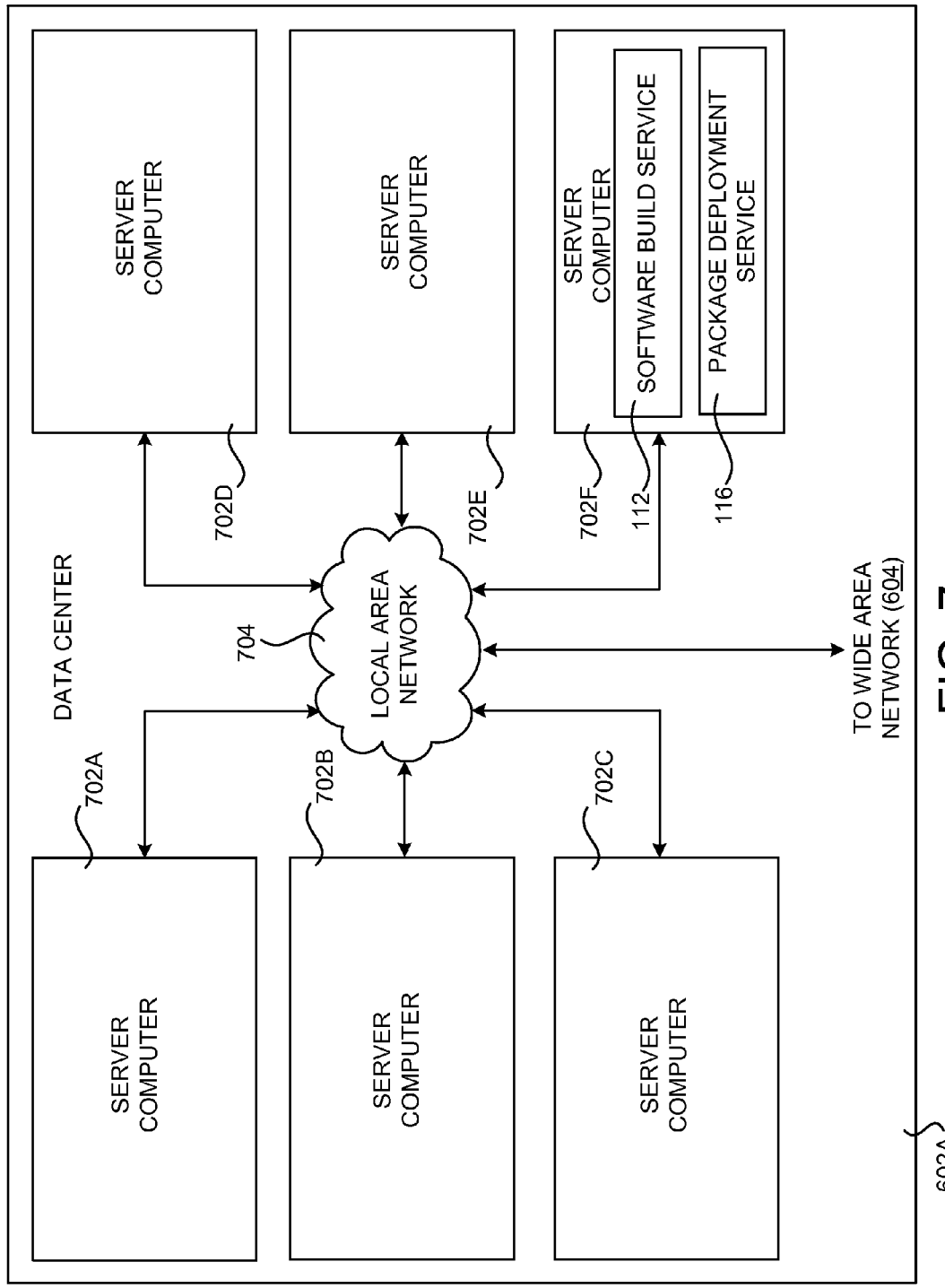
FIG. 7 is a network diagram illustrating aspects of a data center that can be utilized to implement the various technologies presented herein.

FIG. 7 is a computing system diagram that illustrates a configuration for a data center 602A that can be utilized to implement the various technologies described herein. The example data center 602A shown in FIG. 7 includes several server computers 702A-702F (which might be referred to herein singularly as "a server computer 702" or in the plural as "the server computers 702") for providing computing resources for executing distributed programs, such as those described in detail above.

The server computers 702 can be standard tower or rack-mount server computers configured appropriately for executing a distributed program or providing other functionality. The data center 602A shown in FIG. 7 also includes one or more server computers 702, such as the server computer 702F, that execute software components for providing aspects of the functionality described above. In particular, the server computer 702F can execute the software build service 112 or the package deployment service 116. The server computer 702F can also execute other software components not specifically shown in FIG. 7.

In the example data center 602A shown in FIG. 7, an appropriate LAN 704 is utilized to interconnect the server computers 702. The LAN 704 is also connected to the WAN 604 illustrated in FIG. 6. It should be appreciated that the network topology illustrated in FIGS. 6 and 7 has been greatly simplified for discussion purposes and that many more networks and networking devices can be utilized to interconnect the various computing systems disclosed herein. Appropriate load balancing devices or software modules can also be utilized for balancing a load between each of the data centers 602, between each of the server computers 702 in each data center 602, or between virtual machine instances executing within the distributed computing environment. These network topologies and devices should be apparent to those skilled in the art.

It should also be appreciated that the data center 602A described in FIG. 7 is merely illustrative and that other implementations can be utilized. Additionally, it should be appreciated that the disclosed functionality can be implemented in software, hardware or a combination of software and hardware. Other implementations should be apparent to those skilled in the art. Additional details regarding one computer architecture for implementing the server computers 702 will be described below with regard to FIG. 8.

Figure 8:
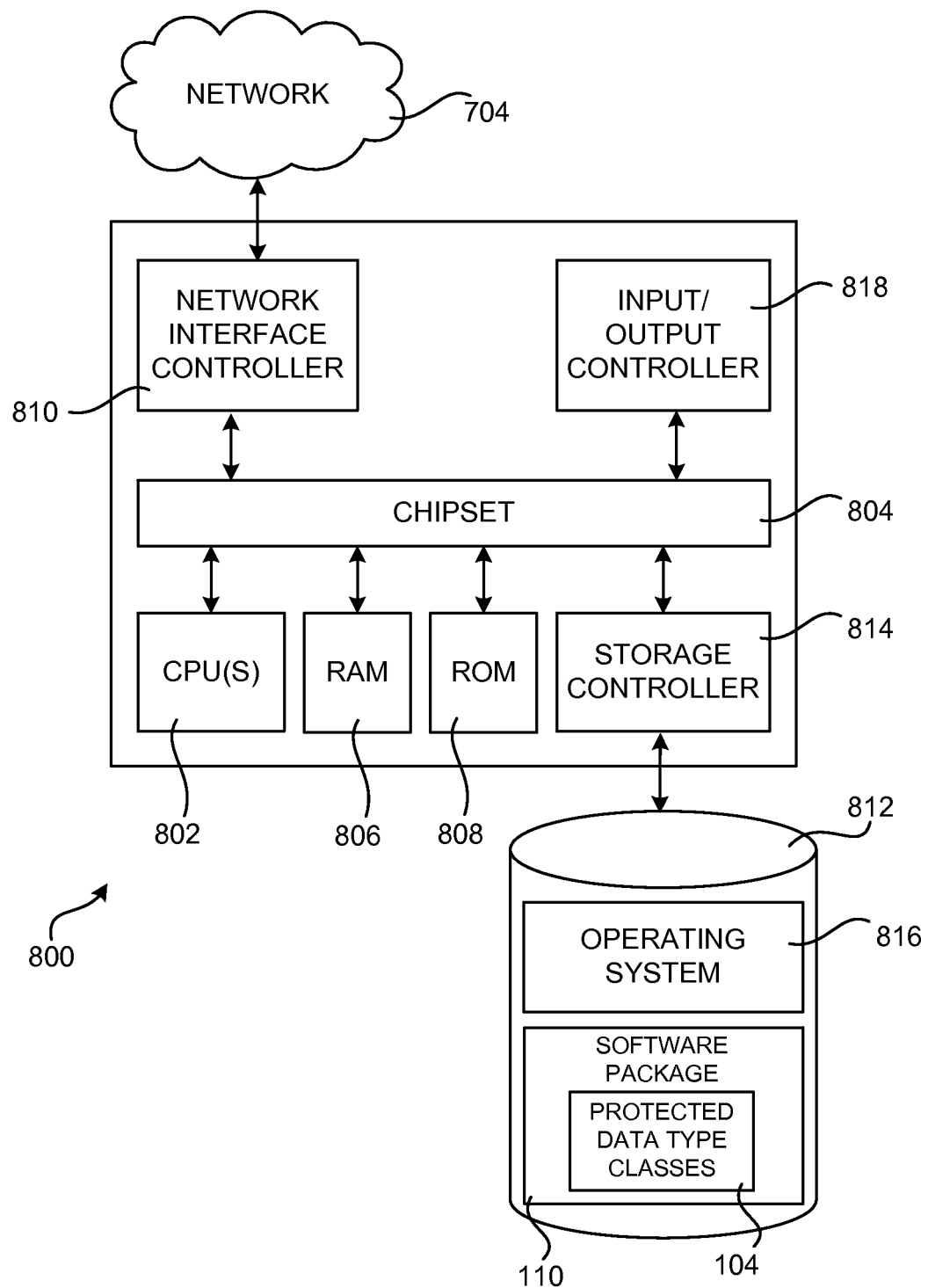
FIG. 8 is a computer architecture diagram showing one illustrative computer hardware architecture for implementing a computing device that can be utilized to implement aspects of the various configurations presented herein.

FIG. 8 shows an example computer architecture for a computer 800 capable of executing the program components described above for protected data type handling awareness and the other functionality disclosed herein. The computer architecture shown in FIG. 8 illustrates a conventional server computer, workstation, desktop computer, laptop, tablet, network appliance, e-reader, smartphone, or other computing device, and can be utilized to execute any aspects of the software components presented herein described as executing within the data centers 602A-602D, on the server computers 602A-602F, or on any other computing system mentioned herein.

The computer 800 includes a baseboard, or "motherboard," which is a printed circuit board to which a multitude of components or devices can be connected by way of a system bus or other electrical communication paths. In one illustrative configuration, one or more central processing units ("CPUs") 802 operate in conjunction with a chipset 804. The CPUs 802 can be standard programmable processors that perform arithmetic and logical operations necessary for the operation of the computer 800.

The CPUs 802 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 804 provides an interface between the CPUs 802 and the remainder of the components and devices on the baseboard. The chipset 804 provides an interface to a random access memory ("RAM") 806, used as the main memory in the computer 800. The chipset 804 can further provide an interface to a computer-readable storage medium such as a read-only memory ("ROM") 808 or non-volatile RAM ("NVRAM") for storing basic routines that help to startup the computer 800 and to transfer information between the various components and devices. The ROM 808 or NVRAM can also store other software components necessary for the operation of the computer 800 in accordance with the configurations described herein.

The computer 800 can operate in a networked environment using logical connections to remote computing devices and computer systems through a network, such as the local area network 704. The chipset 804 can include functionality for providing network connectivity through a NIC 810, such as a gigabit Ethernet adapter. The NIC 810 is capable of connecting the computer 800 to other computing devices over the network 704. It should be appreciated that multiple NICs 810 can be present in the computer 800, connecting the computer to other types of networks and remote computer systems.

The computer 800 can be connected to a mass storage device 812 that provides non-volatile storage for the computer. The mass storage device 812 can store system programs, application programs, other program modules, and data, which have been described in greater detail herein. The mass storage device 812 can be connected to the computer 800 through a storage controller 814 connected to the chipset 804. The mass storage device 812 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 can store data on the mass storage device 812 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 812 is characterized as primary or secondary storage, and the like.

For example, the computer 800 can store information to the mass storage device 812 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the mass storage device 812 by detecting the physical states or characteristics of one or more particular locations within the physical storage units.

In addition to the mass storage device 812 described above, the computer 800 can have access to other computer-readable storage media to store and retrieve information, such as program modules, data structures, or other data. It should be appreciated by those skilled in the art that computer-readable storage media can be any available media that provides for the storage of non-transitory data and that can be accessed by the computer 800.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 812 can store an operating system 816 utilized to control the operation of the computer 800. According to one configuration, the operating system comprises the LINUX operating system. According to another configuration, the operating system comprises the WINDOWS® SERVER operating system from MICROSOFT Corporation. According to a further configuration, the operating system comprises the UNIX operating system. It should be appreciated that other operating systems can also be utilized. The mass storage device 812 can store other system or application programs and data utilized by the computer 800, such as the software package 110, including one or more protected data type classes 104, and/or the other software components and data described above. The mass storage device 812 can also store other programs and data not specifically identified herein.

In one configuration, the mass storage device 812 or other computer-readable storage media is encoded with computer-executable instructions which, when loaded into the computer 800, transforms the computer from a general-purpose computing system into a special-purpose computer capable of implementing the configurations described herein. These computer-executable instructions transform the computer 800 by specifying how the CPUs 802 transition between states, as described above. According to one configuration, the computer 800 has access to computer-readable storage media storing computer-executable instructions which, when executed by the computer 800, perform the routines 200 and 400, described above with regard to FIGS. 2 and 4, and the other operations described with reference to the other FIGS.

The computer 800 can also include an input/output controller 818 for receiving and processing input from a number of input devices, such as a keyboard, a mouse, a touchpad, a touch screen, an electronic stylus, or other type of input device. Similarly, the input/output controller 818 can provide output to a display, such as a computer monitor, a flat-panel display, a digital projector, a printer, a plotter, or other type of output device. It will be appreciated that the computer 800 might not include all of the components shown in FIG. 8, can include other components that are not explicitly shown in FIG. 8, or can utilize an architecture completely different than that shown in FIG. 8.

Based on the foregoing, it should be appreciated that technologies for monitoring usage of protected data types have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A computer-implemented method for monitoring a usage of one or more protected data types, the method comprising:
  providing, by way of a computer system, a protected data type library comprising one or more protected data type classes for performing operations on the one or more protected data types;
  generating a fact manifest at a build time of a software package that uses at least one of the one or more protected data type classes, the fact manifest comprising data identifying the one or more protected data types used by the software package;
  causing the software package to be deployed to one or more hosts for execution; and
  generating a protected data type usage graph from at least the fact manifest, the protected data type usage graph comprising data identifying the one or more protected data types utilized by the software package and the one or more hosts to which the software package has been deployed for execution.

2. The computer-implemented method of claim 1, further comprising exposing an application programming interface (API) for obtaining the protected data type usage graph.

3. The computer-implemented method of claim 1, wherein the fact manifest further comprises data identifying a location in the software package where the one or more protected data types are used.

4. The computer-implemented method of claim 1, wherein the one or more protected data type classes are further configured to emit data at a runtime of the software package describing runtime usage of the one or more protected data types on the one or more hosts, and wherein the protected data type usage graph further identifies the runtime usage of the one or more protected data types on the one or more hosts.

5. The computer-implemented method of claim 1, further comprising providing the one or more protected data type classes for use with a plurality of programming languages.

6. The computer-implemented method of claim 1, wherein causing the software package to be deployed to the one or more hosts for execution comprises utilizing the fact manifest and a deployment policy to deploy the software package to at least a host authorized to operate on the one or more protected data types used by the software package.

7. The computer-implemented method of claim 1, wherein the operations on the one or more protected data types comprise one or more of storing the one or more protected data types, converting the one or more protected data types, validating the one or more protected data types, retrieving data from the one or more protected data types, or emitting the one or more protected data types.

8. A computer-implemented method for monitoring a usage of one or more protected data types, the method comprising:
providing, by way of a computer system, a protected data type library comprising one or more protected data type classes configured to perform operations on the one or more protected data types, the one or more protected data type classes further configured to generate data at a runtime describing runtime usage of the one or more protected data types;
causing a software package that uses at least one of the one or more protected data type classes to be deployed to one or more hosts for execution;
causing the software package to be executed on the one or more hosts, whereby the at least one of the one or more protected data type classes emit the data describing the runtime usage of the one or more protected data types on the one or more hosts; and
generating a protected data type usage graph from at least the data describing the runtime usage of the one or more protected data types, the protected data type usage graph comprising data identifying the one or more hosts and the runtime usage of the one or more protected data types on the one or more hosts.

9. The computer-implemented method of claim 8, further comprising exposing an application programming interface (API) for obtaining the protected data type usage graph.

10. The computer-implemented method of claim 8, further comprising generating a fact manifest at a build time of the software package, the fact manifest comprising data identifying the one or more protected data types used by the software package, and wherein the protected data type usage graph further comprises data identifying the one or more protected data types utilized by the software package.

11. The computer-implemented method of claim 8, wherein the protected data type usage graph comprises nodes corresponding to the one or more hosts and vertices connecting the nodes that represent network connections between the one or more hosts, and wherein each node specifies properties defining the runtime usage of the one or more protected data types on the one or more hosts.

12. The computer-implemented method of claim 8, further comprising providing the one or more protected data type classes for use with a plurality of programming languages.

13. The computer-implemented method of claim 8, wherein the operations on the one or more protected data types comprise one or more of storing the one or more protected data types, converting the one or more protected data types, validating the one or more protected data types, retrieving data from the one or more protected data types, or emitting the one or more protected data types.

14. An apparatus, comprising:
one or more processors; and
at least one computer-readable storage medium having instructions stored thereupon which, when executed by the one or more processors, cause the one or more processors to:
provide a protected data type library comprising one or more protected data type classes, at least a protected data type class of the one or more protected data type classes for performing at least an operation on a protected data type;
generate a fact manifest at a build time of a software package that uses at least the protected data type class, the fact manifest comprising data identifying the protected data type used by the software package;
cause the software package to be sent to one or more hosts for execution; and
generate a usage graph from at least the fact manifest, the usage graph comprising data identifying the protected data type used by the software package and the one or more hosts to which the software package has been sent for execution.

15. The apparatus of claim 14, wherein the at least one computer-readable storage medium has further instructions stored thereupon which, when executed by the one or more processors, cause the one or more processors to expose an application programming interface (API) for obtaining the usage graph.

16. The apparatus of claim 14, wherein the fact manifest further comprises data identifying a location in the software package where the operation is performed.

17. The apparatus of claim 14, wherein the protected data type class is configured to emit data at a runtime of the software package describing runtime performance of the operation on the one or more hosts, and wherein the usage graph further identifies the runtime performance of the operation on the one or more hosts.

18. The apparatus of claim 14, wherein the at least one computer-readable storage medium has further instructions stored thereupon which, when executed by the one or more processors, cause the one or more processors to provide the one or more protected data type classes for use with a plurality of programming languages.

19. The apparatus of claim 14, wherein the at least one computer-readable storage medium has further instructions stored thereupon which, when executed by the one or more processors, cause the one or more processors to utilize the fact manifest and a deployment policy to send the software package to the one or more hosts.

20. The apparatus of claim 14, wherein the operation comprises one or more of storing the protected data type, converting the protected data type, validating the protected data type, retrieving data from the protected data type, or emitting the protected data type.

\* \* \* \* \*